United States Patent
Lee

(10) Patent No.: US 11,283,064 B2
(45) Date of Patent: Mar. 22, 2022

(54) LITHIUM SECONDARY BATTERY

(71) Applicant: LG CHEM, LTD., Seoul (KR)

(72) Inventor: Jeongbeom Lee, Daejeon (KR)

(73) Assignee: LG ENERGY SOLUTION, LTD., Seoul (KR)

(*) Notice: Subject to any disclaimer, the term of this patent is extended or adjusted under 35 U.S.C. 154(b) by 184 days.

(21) Appl. No.: 16/610,112

(22) PCT Filed: Dec. 21, 2018

(86) PCT No.: PCT/KR2018/016501
§ 371 (c)(1),
(2) Date: Nov. 1, 2019

(87) PCT Pub. No.: WO2019/132449
PCT Pub. Date: Jul. 4, 2019

(65) Prior Publication Data
US 2020/0083525 A1 Mar. 12, 2020

(30) Foreign Application Priority Data

Dec. 27, 2017 (KR) .................. 10-2017-0181548
Dec. 20, 2018 (KR) .................. 10-2018-0166736

(51) Int. Cl.
*H01M 4/1391* (2010.01)
*H01M 4/131* (2010.01)
(Continued)

(52) U.S. Cl.
CPC ......... *H01M 4/1391* (2013.01); *H01M 4/131* (2013.01); *H01M 4/661* (2013.01);
(Continued)

(58) Field of Classification Search
CPC .......... H01M 10/052; H01M 10/0525; H01M 2004/027; H01M 2004/028;
(Continued)

(56) References Cited

U.S. PATENT DOCUMENTS 10,218,002 B2   2/2019  Choi et al.
2001/0041294 A1* 11/2001 Chu ................ H01M 4/0452
                                                    429/231.9
(Continued)

FOREIGN PATENT DOCUMENTS

CN   103582972 A   2/2014
CN   106601489 A   4/2017
(Continued)

OTHER PUBLICATIONS

Extended European Search Report issued by the European Patent Office dated May 4, 2020 in a corresponding European patent application No. 18896164.3.
(Continued)

*Primary Examiner* — Carlos Barcena
(74) *Attorney, Agent, or Firm* — Morgan, Lewis & Bockius LLP

(57) ABSTRACT

The present disclosure relates to a lithium secondary battery assembled without an anode active material. Since the lithium secondary battery of the present disclosure does not contain an anode active material such as a lithium metal during the assembling process, the manufacturing process is simple and easy, and it is possible to improve processability and manufacturing costs. In addition, it has an irreversible compensating additive, thereby exhibiting excellent battery life.

17 Claims, 2 Drawing Sheets

(51) Int. Cl.
  *H01M 4/66* (2006.01)
  *H01M 10/0525* (2010.01)
  *H01M 4/02* (2006.01)

(52) U.S. Cl.
  CPC ....... *H01M 4/667* (2013.01); *H01M 10/0525* (2013.01); *H01M 2004/027* (2013.01); *H01M 2004/028* (2013.01)

(58) Field of Classification Search
  CPC .. H01M 4/0445; H01M 4/131; H01M 4/1391; H01M 4/382; H01M 4/505; H01M 4/525; H01M 4/5825; H01M 4/62; H01M 4/625; H01M 4/661; H01M 4/667
  See application file for complete search history.

(56) References Cited

U.S. PATENT DOCUMENTS

| | | | |
|---|---|---|---|
| 2003/0049540 A1* | 3/2003 | Kohno | H01M 10/0566 429/324 |
| 2004/0157124 A1 | 8/2004 | Goh et al. | |
| 2006/0251967 A1* | 11/2006 | Goh | H01M 4/525 429/231.1 |
| 2012/0021284 A1 | 1/2012 | Lee et al. | |
| 2012/0328955 A1 | 12/2012 | Ryu et al. | |
| 2014/0147715 A1 | 5/2014 | Ishibashi et al. | |
| 2015/0004487 A1 | 1/2015 | Lee et al. | |
| 2015/0340692 A1 | 11/2015 | Park et al. | |
| 2015/0372304 A1 | 12/2015 | Hasegawa et al. | |

FOREIGN PATENT DOCUMENTS

| | | |
|---|---|---|
| KR | 10-2006-0106772 A | 10/2006 |
| KR | 10-2008-0108723 A | 12/2008 |
| KR | 10-2012-0009703 A | 2/2012 |
| KR | 10-2015-0014878 A | 2/2015 |
| KR | 10-2015-0028206 A | 3/2015 |
| KR | 10-2015-0035881 A | 4/2015 |
| KR | 10-2016-0015708 A | 2/2016 |
| KR | 10-2016-0128014 A | 11/2016 |
| WO | 2015126932 A1 | 8/2015 |
| WO | 2018236168 A1 | 12/2018 |

OTHER PUBLICATIONS

International Search Report issued in corresponding International Patent Application No. PCT/KR2018/016501, dated Apr. 9, 2019.
Jiangfeng Qian et al., Anode-Free Rechargeable Lithium Metal Batteries, Advanced Functional Materials, Aug. 8, 2016, vol. 26, p. 7094-7102.
Chinese Office Action dated Jan. 26, 2022, issued in corresponding Chinese Patent Application No. 201880029379.5.

* cited by examiner

[FIG. 1]
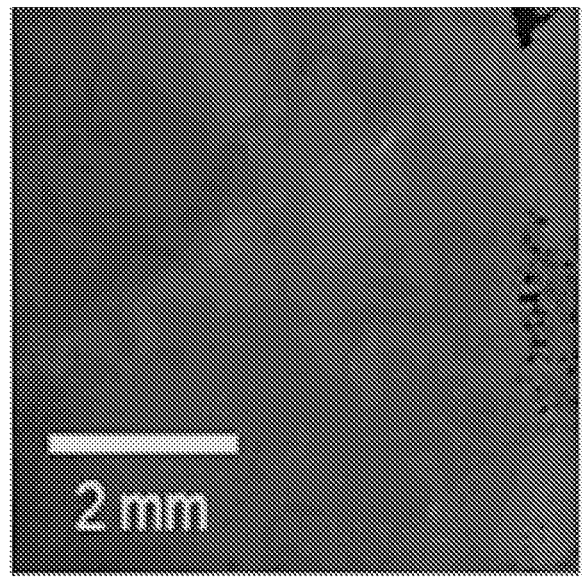
[FIG. 2]
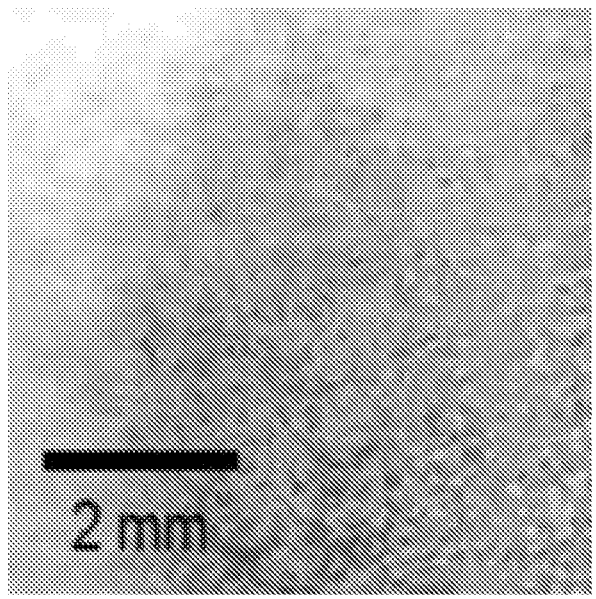

[FIG. 3]
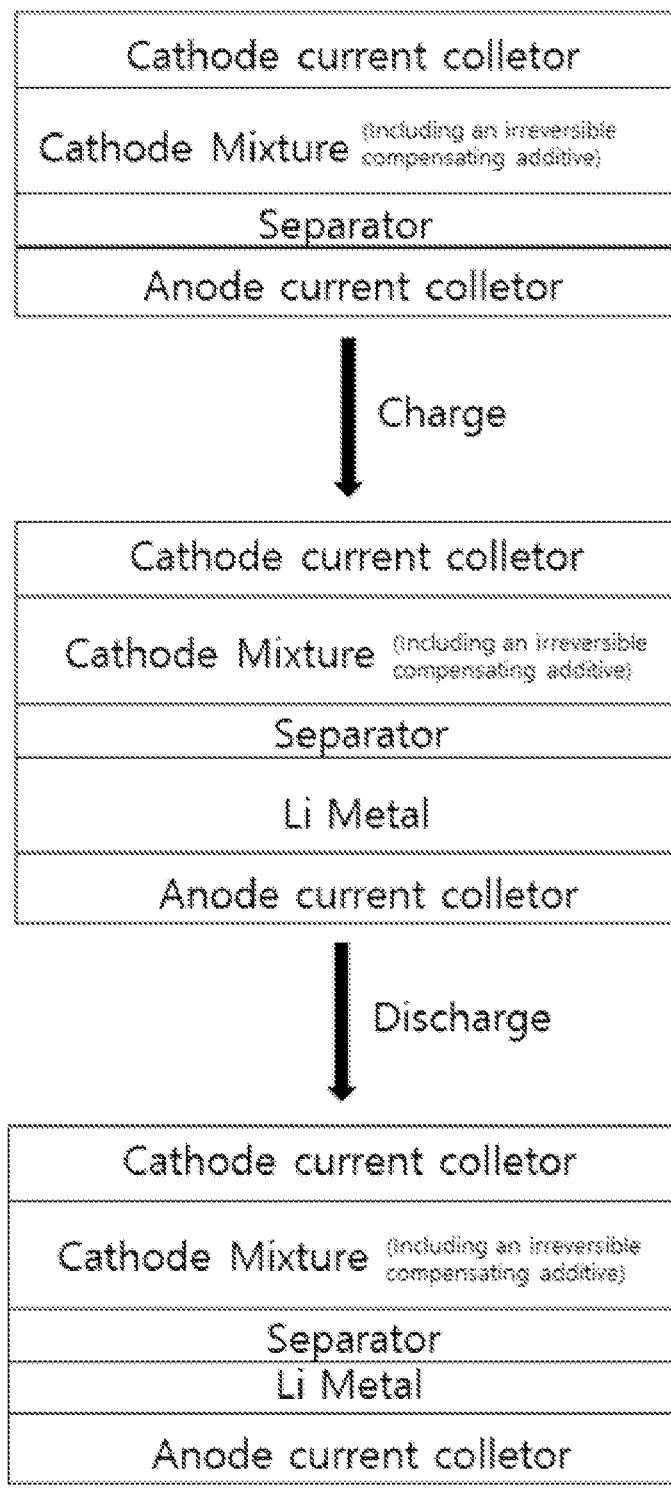

LITHIUM SECONDARY BATTERY

CROSS-REFERENCE TO RELATED APPLICATION(S)

This application claims the benefits of Korean Patent Applications No. 10-2017-0181548 filed on Dec. 27, 2017 and No. 10-2018-0166736 filed on Dec. 20, 2018 with the Korean Intellectual Property Office, the disclosures of which are incorporated herein by reference in their entirety.

TECHNICAL FIELD

The present disclosure relates to a lithium secondary battery having a simple and economical manufacturing process, and that is excellent in capacity and battery life.

BACKGROUND OF ART

A variety of devices requiring a battery such as cellular phones, wireless electronic equipment, and electronic vehicles have been developed. The development of the devices has brought an increase in demand for secondary batteries. In particular, in addition to the trend toward size reduction of electronic products, the weight and size of secondary batteries are being gradually reduced.

In response to this trend, recently, lithium metal secondary batteries (lithium metal batteries, LMB) have received much attention. A lithium metal secondary battery uses a lithium metal electrode containing a lithium metal as an active material for an anode. Lithium has advantages of low density and a low standard reduction potential of −3.04 V, thus being lightweight and imparting high energy to secondary batteries produced therefrom.

However, the lithium metal easily reacts with water and oxygen in the air due to its high reactivity and it is soft, so it is difficult to apply the existing assembling process of the lithium secondary battery as it is.

The manufacturing process of the lithium metal electrode is performed in a chamber filled with an inert gas, and the level of dehumidification is required to be higher than that of the conventional lithium secondary battery. Furthermore, since the lithium metal is poor in precision when punched due to its soft nature and the mold is easily contaminated due to its sticky nature, it is difficult to apply the continuous process used in the conventional lithium secondary batteries. Moreover, in order to increase energy density of the electrode, a very thin lithium metal electrode having a thickness of 20 μm or less is required, but in this case, there is a problem that processability is further lowered. For these reasons, the current price of the lithium metal electrode is very high.

Accordingly, it is necessary to develop a method for improving processability and economic efficiency of a lithium secondary battery using a lithium metal as an anode active material.

DETAILED DESCRIPTION OF THE INVENTION

Technical Problem

The present disclosure is to provide a lithium secondary battery using a lithium metal as an anode active material capable of improving processability and economic efficiency of the manufacturing process.

Technical Solution

In order to solve the problem, the present disclosure provides a lithium secondary battery, including:
an anode composed of a single layer of an anode current collector;
a cathode containing a cathode mixture formed on a cathode current collector;
a separator interposed between the anode and the cathode; and
an electrolyte,
wherein the cathode mixture includes an irreversible compensating additive.

A lithium metal layer, preferably a lithium metal layer having a thickness of 2 μm or more, may be formed on the anode current collector of the lithium secondary battery after the first 1 to 5 charges and discharges.

The irreversible compensating additive desorbs lithium ions upon initial charging of the lithium secondary battery to supply the lithium ions to the single layer of an anode current collector, and the irreversible compensating additive in which the lithium ions have been desorbed may be converted into an irreversible state so that the lithium ions are not occluded.

Specifically, the irreversible compensating additive may be at least one selected from the group consisting of $Li_2NiO_2$, $Li_2CuO_2$, $Li_6CoO_4$, $Li_5FeO_4$, $Li_6MnO_4$, $Li_2MoO_3$, $Li_3N$, $Li_2O$, LiOH, and $Li_2CO_3$.

The irreversible compensating additive may be contained in an amount of 1 to 50 wt % based on a total weight of the cathode mixture.

The cathode mixture may include at least one selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3) as a cathode active material.

Further, the anode current collector may have a lithium metal protective layer on the surface, and a lithium metal layer may be formed between the anode current collector and the lithium metal protective layer of the lithium secondary battery after the first 1 to 5 charges and discharges.

The lithium metal protective layer may include an organic or inorganic compound having lithium ion conductivity of $10^{-7}$ S/cm or more.

The anode current collector may further include an adhesive layer.

Advantageous Effects

Since the lithium secondary battery of the present disclosure does not contain a lithium metal during the assembling process, the manufacturing process is simple and easy, and it is possible to improve processability and manufacturing costs. In addition, the lithium secondary battery of the present disclosure exhibits high energy density and excellent battery life.

BRIEF DESCRIPTION OF THE DRAWINGS

FIG. 1 is an optical microscope image of the anode surface of Comparative Example 1 after charging and discharging once.

FIG. 2 is an optical microscope image of the anode surface of Example 3 after charging and discharging once.

FIG. 3 illustrates the structures of the claimed embodiment after charge and discharge

DETAILED DESCRIPTION OF THE EMBODIMENTS

The terminology used herein is for the purpose of describing particular embodiments only and is not intended to be limiting of the invention. The singular forms are intended to include the plural forms as well, unless the context clearly indicates otherwise. It will be further understood that the terms "include", "have", or "possess" when used in this specification, specify the presence of stated features, steps, components, or combinations thereof, but do not preclude the presence or addition of one or more other features, steps, components, or combinations thereof.

As the present invention can be variously modified and have various forms, specific embodiments thereof are shown by way of examples and will be described in detail. However, it is not intended to limit the present invention to the particular form disclosed, and it should be understood that the present invention includes all modifications, equivalents, and replacements within the idea and technical scope of the present invention.

Hereinafter, the present disclosure will be described in detail.

The present disclosure provides a lithium secondary battery, including:

an anode composed of a single layer of an anode current collector;

a cathode containing a cathode mixture formed on a cathode current collector;

a separator interposed between the anode and the cathode; and an electrolyte, wherein the cathode mixture includes an irreversible compensating additive.

Since the lithium secondary battery of the present disclosure does not contain a lithium metal in the anode when initially assembling the battery, the assembling facility and process of the lithium secondary battery using a conventional carbon-based or silicon-based anode active material can be applied as it is. Therefore, inactivation and dehumidification conditions required for assembling a battery containing a lithium metal are unnecessary and the problem of mold contamination during punching is not serious, so the battery can be manufactured in a continuous process. Accordingly, manufacturing costs can be greatly reduced as compared with the case of assembling the lithium secondary battery using a lithium metal electrode.

The anode current collector is not particularly limited as long as it has electrical conductivity without causing chemical changes in the battery. For example, it may be copper; stainless steel; aluminum; nickel; titanium; sintered carbon; copper or stainless steel surface-treated with carbon, nickel, titan or silver; an aluminum-cadmium alloy; or the like. Further, the anode current collector may be in various forms such as a film, a sheet, a foil, a net, a porous body, a foam body, and a nonwoven fabric body with or without fine irregularities on its surface. For example, a copper foil may be used as the anode current collector, but the present disclosure is not limited thereto.

The thickness of the current collector is not particularly limited, but is preferably 5 to 100 μm, and more preferably 5 to 50 μm. When the thickness of the current collector is less than 5 μm, it may be difficult to handle in the process. When it exceeds 100 μm, the thickness and weight of the battery may be unnecessarily increased, so the energy density may be reduced. Therefore, the above range is preferable in terms of battery performance.

In this disclosure, the anode is formed as a single layer of the anode current collector, which means that no separate active material-containing layer is formed on the anode current collector. For reference, the lithium secondary battery according to one embodiment of the present disclosure is provided with an anode without a separate active material-containing layer before initial charging and discharging. Then, the lithium metal transferred from the irreversible compensating additive contained in the cathode mixture by the initial charging and discharging can irreversibly form a lithium metal layer on the anode current collector, and the lithium metal layer and the anode current collector layer can act as the anode.

Meanwhile, the anode current collector of the present disclosure may further contain a lithium metal protective layer for the purpose of protecting the surface of the lithium metal layer to be formed later and preventing the growth of lithium dendrites, which causes a battery short circuit. The lithium metal protective layer is formed on the surface of the anode current collector, and the lithium metal is plated between the lithium metal protective layer and the anode current collector after the first charging and discharging of the battery. The method of forming the lithium metal protective layer on the anode current collector is not particularly limited, and a method known in the art may be appropriately used depending on materials of the protective layer.

The lithium metal protective layer may be any kind known in the art, but may include, for example, an organic or inorganic compound having lithium ion conductivity of $10^{-7}$ S/cm or more, or $10^{-5}$ S/cm or more.

Specifically, the organic compound may be a polymer having ionic conductivity. The ion-conducting polymer has a plurality of electron donating atoms or atomic groups capable of forming coordinate bonds with lithium ions in the chain, and can transfer lithium ions between positions capable of forming coordinate bonds by a local movement of the polymer chain segments.

For example, the ion-conducting polymer may be at least one selected from the group consisting of polyethylene oxide (PEO), polypropylene oxide (PPO), polyethylene glycol (PEG), polyphosphazene, polysiloxane, polydimethylsiloxane, polyacrylonitrile (PAN), polymethylmethacrylate (PMMA), polyvinylchloride, polyvinylidene fluoride (PVDF), polyvinylidene fluoride-hexafluoropropylene (PVDF-co-HFP), polyethyleneimine, polyphenylene terephthalamide, polymethoxy polyethylene glycol methacrylate, and poly-2-methoxy ethyl glycidyl ether. Preferably, polyethylene oxide (PEO) can be used.

The ion-conducting polymer may further include a lithium salt for improving ionic conductivity. The kind of the lithium salt is not particularly limited, and may be one selected from the group consisting of, for example, LiCl, LiBr, LiI, $LiClO_4$, $LiBF_4$, $LiB_{10}Cl_{10}$, $LiPF_6$, $LiCF_3SO_3$, $LiCF_3CO_2$, $LiAsF_6$, $LiSbF_6$, $LiAlCl_4$, $CH_3SO_3Li$, $CF_3SO_3Li$, LiSCN, $LiC(CF_3SO_2)_3$, $(CF_3SO_2)_2NLi$, $(FSO_2)_2NLi$, lithium chloroborane, lower aliphatic carboxylic acid lithium, 4-phenyl lithium borate, lithium imide, and a combination thereof.

The inorganic compound may be one or a mixture of two or more selected from the group consisting of, for example, LiPON, a hydride compound, a thio-LISICON compound, a NASICON compound, a LISICON compound, and a perovskite compound.

The hydride compound may be LiBH$_4$-LI, Li$_3$N, Li$_2$NH, Li$_2$BNH$_6$, Li$_{1.8}$N$_{0.4}$C$_{10.6}$, LiBH$_4$, Li$_3$P—LiCl, Li$_4$SiO$_4$, Li$_3$PS$_4$, or Li$_3$SiS$_4$, but the present disclosure is not limited thereto.

The thio-LISICON compound may be Li$_{10}$GeP$_2$S$_{12}$, Li$_{3.25}$Ge$_{0.25}$P$_{0.75}$S$_4$, or Li$_2$S—GeS—Ga$_2$S$_3$, but the present disclosure is not limited thereto.

The NASICON compound may be Li$_{1.3}$Al$_{0.3}$Ge$_{1.7}$(PO$_4$)$_3$, Li$_{1.3}$Al$_{0.3}$Ti$_{1.7}$(PO$_4$)$_3$, or LiTi$_{0.5}$Zr$_{1.5}$(PO$_4$)$_3$, but the present disclosure is not limited thereto.

The LISICON compound may be Li$_{14}$Zn(GeO$_4$)$_4$, but the present disclosure is not limited thereto.

The perovskite compound may be Li$_x$La$_{1-x}$TiO$_3$ (0<x<1) or Li$_7$La$_3$Zr$_2$O$_{12}$, specifically Li$_{0.35}$La$_{0.55}$TiO$_3$, Li$_{0.5}$La$_{0.5}$TiO$_3$, or Li$_7$La$_3$Zr$_2$O$_{12}$, but the present disclosure is not limited thereto.

In addition, the anode current collector of the present disclosure may further include an adhesive layer for the purpose of securing an adhesion property with a separator during the assembling process and improving processability. The adhesive layer may be formed on at least one surface of the anode current collector, and if the anode current collector includes a lithium metal protective layer on the surface, the adhesive layer may be formed on the lithium metal protective layer. The lithium metal protective layer may also serve as an adhesive layer, but when the adhesive layer is further included as described above, the adhesion property with the separator can be further improved. Specifically, in the case of including the adhesive layer, the anode of the present disclosure may have a structure in which a current collector and an adhesive layer are laminated, or a structure in which a current collector, a lithium metal protective layer, and an adhesive layer are sequentially laminated, and the separator is brought into contact with the adhesive layer of the anode when assembling the battery.

The adhesive layer is used for bonding between the anode current collector and the separator by applying heat and pressure. Examples of the adhesive layer include polyvinylidene fluoride (PVDF), polyvinyl alcohol (PVA), polyacrylic acid (PAA), polymethacrylic acid (PMA), polymethylmethacrylate (PMMA), polyacrylamide (PAM), polymethacrylamide, polyacrylonitrile (PAN), polymethacrylonitrile, polyimide (PI), alginic acid, alginate, chitosan, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated-EPDM, styrene-butadiene rubber (SBR), fluorine rubber, and various copolymers thereof.

The thinner the thickness of the lithium metal protective layer and the adhesive layer is, the better the power output is. However, the growth of the lithium dendrites can be prevented only when the thickness is formed to be more than a certain thickness, and the adhesion property can be ensured. As an example, the thickness of the lithium ion conductive protective layer or the adhesive layer may be 1 to 50 μm, and 1 to 20 μm, respectively. When the thickness of the protective layer or the adhesive layer exceeds 50 μm, initial interfacial resistance may increase to cause an increase in internal resistance when manufacturing the battery, and also the cell thickness may increase to cause a decrease in energy density. Therefore, it is preferable to satisfy the above range.

Like the anode current collector, the cathode current collector is not particularly limited as long as it has high electrical conductivity without causing chemical changes in the battery. For example, it may be stainless steel; aluminum; nickel; titan; sintered carbon; aluminum or stainless steel surface-treated with carbon, nickel, titanium, or silver; or the like. The cathode current collector may be in various forms such as a film, a sheet, a foil, a net, a porous body, a foam body, and a nonwoven fabric body with fine irregularities on its surface to increase adhesive force with the cathode active material. For example, an aluminum foil may be used as the cathode current collector, but the present disclosure is not limited thereto.

The thickness of the cathode current collector is preferably in the range of 5 to 100 μm in the same manner as the anode current collector in terms of processability and battery performance.

The cathode mixture formed on the cathode current collector contains a cathode active material and an irreversible compensating additive, and may further contain a conductive material, a binder, and the like.

In the present disclosure, the irreversible compensating additive is a compound containing lithium ions, and is included in the cathode mixture to supply an excess amount of lithium metals to the anode. The irreversible compensating additive desorbs lithium ions upon initial charging of a lithium secondary battery to supply the lithium ions to a single layer of an anode current collector, and the irreversible compensating additive in which the lithium ions have been desorbed is converted into an irreversible state so that the lithium ions are not occluded.

That is, when lithium ions remain in the irreversible compensating additive that has been converted into the irreversible state, it is possible to occlude and release the remaining lithium ions separately from the initially released lithium ions. However, the lithium ions released from the irreversible compensating additive upon initial charging are not occluded by the irreversible compensating additive during subsequent discharging, and are plated on the single layer of the anode current collector to form a lithium metal layer.

Therefore, the lithium secondary battery of the present disclosure does not contain lithium metals in the cathode at first, but contains lithium metals by the initial charging and discharging. When the adhesive layer and/or the lithium metal protective layer are formed on the surface of the anode current collector, the lithium metal is formed on the surface of the anode current collector, that is, between the anode current collector and the adhesive layer or between the anode current collector and the lithium metal protective layer. Accordingly, the surface of the lithium metal layer can be protected by the adhesive layer and/or the lithium metal protective layer.

For example, Li$_2$NiO$_2$, which can be used as the irreversible compensating additive, releases 1 mole or more of lithium ions through the reaction of Reaction Formula 1 below upon charging within the first few times, for example, at the first charging. Thereafter, it changes to LiNiO$_2$, which is irreversible.

$$Li_2NiO_2 \rightarrow xLi^+ + xe^- + Li_{2-x}NiO_2(1<x<2) \quad \text{[Reaction Formula 1]}$$

The Li$_{2-x}$NiO$_2$ is not converted to Li$_2$NiO$_2$ by occluding lithium ions again, and can occlude and release only one mole or less of lithium ions in the subsequent charging and discharging process.

For example, Li$_3$N, which is another irreversible compensating additive, releases 6 moles or more of lithium ions through the reaction of Reaction Formula 2 below upon charging within the first few times, for example, at the first charging, and emits N$_2$ gas.

[Reaction Formula 2]

Since N$_2$ changes into a gas form, it cannot be converted to Li$_3$N by occluding lithium ions again. In addition, as N$_2$ is emitted to the outside of the cell through a degas process, it does not occupy a volume and weight in the cell, thereby improving energy density.

The irreversible compensating additive is not particularly limited as long as it is a compound having the above-mentioned effect. Specifically, at least one selected from the group consisting of Li$_2$NiO$_2$, Li$_2$CuO$_2$, Li$_6$CoO$_4$, Li$_5$FeO$_4$, Li$_6$MnO$_4$, Li$_2$MoO$_3$, Li$_3$N, Li$_2$O, LiOH, and Li$_2$CO$_3$ may be used. Among them, at least one selected from the group consisting of Li$_2$NiO$_2$, Li$_6$CoO$_4$, and Li$_3$N may be preferably used in terms of stable battery life and energy density, but the present disclosure is not limited thereto.

The initial charging and discharging process for forming the lithium metal layer on the anode current collector may be performed once to five times, preferably once to three times. The thickness of the lithium metal layer generated by the initial charging and discharging process is not particularly limited, but is preferably 2 μm or more in terms of energy density and battery life, and more preferably 5 to 20 μm.

Since the thickness of the lithium metal layer generated by the initial charging and discharging process can be controlled according to the amount of the irreversible compensating additive, the battery is prepared by calculating the required amount of lithium metals upon designing and including the irreversible compensating additive corresponding to the amount of the lithium metals in the cathode mixture. Herein, in addition to the amount of lithium metals required for operating the lithium secondary battery, lithium metals may be further plated on the anode current collector in consideration of the amount of lithium consumed by a reaction with an electrolyte or other irreversible reactions. In this case, it is possible to solve the problem that the battery life is shortened as the lithium metal is lost by operating the battery.

Specifically, the irreversible compensating additive may be contained in an amount of 1 to 50 wt %, or 2 to 20 wt %, based on a total weight of the cathode mixture. Within the above range, the lithium metal layer having a thickness of 2 μm or more as described above can be prepared by the initial charging and discharging process, thereby improving the battery life.

The cathode active material for the lithium secondary battery of the present disclosure is not particularly limited, and cathode active materials that are generally used in lithium secondary batteries can be suitable. For example, the cathode active material may be a lithium-containing transition metal oxide, and specifically, at least one selected from the group consisting of Li$_x$CoO$_2$ (0.5<x<1.3), Li$_x$NiO$_2$ (0.5<x<1.3), Li$_x$MnO$_2$ (0.5<x<1.3), Li$_x$Mn$_2$O$_4$ (0.5<x<1.3), Li$_x$(Ni$_a$Co$_b$Mn$_c$)O$_2$ (0.5<x<1.3, 0<a<1, 0<b<1, 0<c<1, a+b+c=1), Li$_x$Ni$_{1-y}$Co$_y$O$_2$ (0.5<x<1.3, 0<y<1), Li$_x$Co$_{1-y}$Mn$_y$O$_2$ (0.5<x<1.3, 0≤y<1), Li$_x$Ni$_{1-y}$Mn$_y$O$_2$ (0.5<x<1.3, O≤y<1), Li$_x$(Ni$_a$Co$_b$Mn$_c$)O$_4$ (0.5<x<1.3, 0<a<2, 0<b<2, 0<c<2, a+b+c=2), Li$_x$Mn$_{2-z}$Ni$_z$O$_4$ (0.5<x<1.3, 0<z<2), Li$_x$Mn$_{2-z}$Co$_z$O$_4$ (0.5<x<1.3, 0<z<2), Li$_x$CoPO$_4$ (0.5<x<1.3), and Li$_x$FePO$_4$ (0.5<x<1.3). However, the present disclosure is not limited thereto. The lithium-containing transition metal oxide may be coated with a metal such as aluminum (Al) or a metal oxide. In addition to the lithium-containing transition metal oxide, sulfides, selenides, and halides may also be used.

The cathode mixture may include a conductive material to further improve conductivity of the electrode active material. The conductive material is not particularly limited as long as it has electrical conductivity without causing chemical changes in the battery. Examples of the conductive material include graphite such as natural graphite or artificial graphite; carbon blacks such as acetylene black, ketjen black, channel black, furnace black, lamp black, and thermal black; conductive fibers such as a carbon fiber and a metallic fiber; metallic powders such as carbon fluoride powder, aluminum powder, and nickel powder; conductive whiskers such as zinc oxide and potassium titanate; conductive metal oxides such as titanium oxide; polyphenylene derivatives; and the like.

The binder resin is used to assist in binding between the electrode active material and the conductive material, and in binding to the current collector. Examples of the binder resin include polyvinylidene fluoride (PVDF), polyvinyl alcohol (PVA), polyacrylic acid (PAA), polymethacrylic acid (PMA), polymethylmethacrylate (PMMA), polyacrylamide (PAM), polymethacrylamide, polyacrylonitrile (PAN), polymethacrylonitrile, polyimide (PI), alginic acid, alginate, chitosan, carboxymethyl cellulose (CMC), starch, hydroxypropyl cellulose, regenerated cellulose, polyvinylpyrrolidone, tetrafluoroethylene, polyethylene, polypropylene, an ethylene-propylene-diene polymer (EPDM), sulfonated-EPDM, styrene-butadiene rubber (SBR), fluorine rubber, and various copolymers thereof.

The cathode of the present disclosure can be prepared according to conventional methods. Specifically, it may be formed by applying a composition for forming a cathode active material layer, which is prepared by mixing a cathode active material, an irreversible compensating additive, a conductive material, and a binder in an organic solvent, on a current collector, drying the same, and optionally compression molding to the current collector in order to improve electrode density. Herein, it is preferable to use an organic solvent which can uniformly disperse the cathode active material, the binder, and the conductive material and evaporate easily. Specific examples include N-methylpyrrolidone, acetonitrile, methanol, ethanol, tetrahydrofuran, water, isopropyl alcohol, and the like, but are not limited thereto.

A common separator may be interposed between the cathode and the anode. The separator is a physical separating membrane capable of physically separating the electrodes. Any separator can be used without any particular limitations as long as it is used as a conventional separator. Particularly, it is preferable that the separator has low resistance against ion movements of the electrolyte and an excellent impregnating property with the electrolyte.

In addition, the separator separates or insulates the cathode and the anode from each other, and enables transportation of lithium ions between the cathode and the anode. This separator may be composed of a porous and nonconductive or insulating material. The separator may be an independent material such as a film, or a coating layer added to the cathode and/or the anode.

The separator may be formed of a porous substrate, and any porous substrate commonly used in an electrochemical device can be used. For example, the separator may be composed of at least one polymer selected from the group consisting of polyethylene, polypropylene, polybutylene, polypentene, polyethylene terephthalate, polybutylene terephthalate, polyester, polyacetal, polyamide, polycarbonate, polyimide, polyetheretherketone, polyether sulfone, polyphenylene oxide, polyphenylene sulfide, and polyethylene naphthalate. Among them, an olefin-based polymer such as polypropylene is preferable in terms of chemical resistance and hydrophobicity, and polyethylene is more preferable.

The electrolyte may be an electrolyte containing a lithium salt and a non-aqueous organic solvent, an organic solid electrolyte, or an inorganic solid electrolyte generally used in the lithium secondary battery.

Examples of the non-aqueous organic solvent include non-aprotic organic solvents such as N-methyl-2-pyrrolidinone, propylene carbonate, ethylene carbonate, butylene carbonate, dimethyl carbonate, diethyl carbonate, ethyl methyl carbonate, gamma-butyrolactone, 1,2-dimethoxy ethane, 1,2-diethoxy ethane, tetrahydroxy franc, 2-methyl tetrahydrofuran, dimethyl sulfoxide, 1,3-dioxolane, 4-methyl-1,3-dioxane, diethyl ether, formamide, dimethylformamide, dioxolane, acetonitrile, nitromethane, methyl formate, methyl acetate, phosphoric acid triester, trimethoxy methane, dioxolane derivatives, sulfolane, methyl sulfolane, 1,3-dimethyl-2-imidazolidinone, propylene carbonate derivatives, tetrahydrofuran derivatives, ether, methyl propionate, ethyl propionate, and the like.

The lithium salt is a material that is readily soluble in the non-aqueous electrolyte, and examples thereof include LiCl, LiBr, LiI, $LiClO_4$, $LiBF_4$, $LiB_{10}Cl_{10}$, $LiPF_6$, $LiAsF_6$, $LiSbF_6$, $LiAlCl_4$, LiSCN, $LiC_4BO_8$, $LiCF_3CO_2$, $LiCH_3SO_3$, $LiCF_3SO_3$, $LiN(SO_2CF_3)_2$, $LiN(SO_2C_2F_5)_2$, $LiC_4F_9SO_3$, $LiC(CF_3SO_2)_3$, lithium chloroborane, lower aliphatic carboxylic acid lithium, lithium tetraphenyl borate, lithium imide, and the like.

Examples of the organic solid electrolyte include polyethylene derivatives, polyethylene oxide derivatives, polypropylene oxide derivatives, phosphoric acid ester polymers, polyagitation lysine, polyester sulfide, polyvinyl alcohols, polyvinylidene fluoride, polymers containing a secondary dissociation group, and the like.

Examples of the inorganic solid electrolyte include nitrides, halides, and sulfates of lithium (Li) such as $Li_3N$, LiI, $Li_5NI_2$, $Li_3N$—LiI—LiOH, $LiSiO_4$, $LiSiO_4$—LiI—LiOH, $Li_2SiS_3$, $Li_4SiO_4$, $Li_4SiO_4$—LiI—LiOH, $Li_3PO_4$—$Li_2S$—$SiS_2$, and the like.

In addition, the electrolyte may further include other additives in order to improve charging/discharging characteristics, flame retardancy, and the like. Examples of the additive include pyridine, triethylphosphite, triethanolamine, cyclic ether, ethylenediamine, n-glyme, hexaphosphoric triamide, nitrobenzene derivatives, sulfur, quinone imine dyes, N-substituted oxazolidinone, N,N-substituted imidazolidine, ethylene glycol dialkyl ether, ammonium salts, pyrrole, 2-methoxy ethanol, aluminum trichloride, fluoroethylene carbonate (FEC), propene sultone (PRS), vinylene carbonate (VC), and the like.

The shape of the above-described lithium secondary battery is not particularly limited, and may be, for example, a jelly-roll type, a stack type, a stack-folding type (including a stack-Z-folding type), or a lamination-stack type. Preferably, it may be a stack-folding type.

The preparation method of a lithium secondary battery of the present disclosure is not particularly limited, but specifically includes the steps of: preparing an electrode assembly in which the cathode, the separator, and the anode composed of a single layer of an anode current collector are sequentially laminated, placing the electrode assembly in a battery case, injecting an electrolyte into an upper part of the case, and then sealing and assembling it with a cap plate and a gasket. Thereafter, the lithium metal layer may be formed on the single layer of the anode current collector by conducting charging and discharging for the first several times as described above.

Since the lithium secondary battery of the present disclosure does not contain a lithium metal which is difficult to handle in assembling the battery, it can be manufactured by the same process using the conventional assembling facilities of the lithium secondary battery. Therefore, manufacturing costs of the battery can be greatly reduced, and the battery can be manufactured in a continuous process, thereby improving convenience in the process and economical efficiency. Further, the lithium secondary battery of the present disclosure exhibits high energy density and excellent battery life.

EXAMPLES

Preparation Example: Preparation of Lithium Metal Secondary Battery (1) Preparation of Cathode A cathode slurry containing an irreversible compensating additive was prepared according to the composition shown in Table 1 below. Thereafter, the slurry was applied on one surface of an aluminum metal current collector, and then dried at a temperature of 130° C. to prepare a cathode.

TABLE 1

| | Irreversible compensating additive | Wt % of irreversible compensating additive in cathode mixture | Cathode active material | Composition of cathode slurry (g) | | | | |
|---|---|---|---|---|---|---|---|---|
| | | | | Cathode active material | Additive | Conductive material | Binder | NMP |
| Ex. 1 | $Li_2NiO_2$ | 5% | $LiNi_{0.8}Co_{0.1}Mn_{0.1}O_2$ | 91 | 5 | 2 | 2 | 50 |
| Ex. 2 | $Li_2NiO_2$ | 10% | $LiNi_{0.8}Co_{0.1}Mn_{0.1}O_2$ | 86 | 10 | 2 | 2 | 50 |
| Ex. 3 | $Li_2NiO_2$ | 15% | $LiNi_{0.8}Co_{0.1}Mn_{0.1}O_2$ | 81 | 15 | 2 | 2 | 50 |
| Ex. 4 | $Li_2NiO_2$ | 20% | $LiNi_{0.8}Co_{0.1}Mn_{0.1}O_2$ | 76 | 20 | 2 | 2 | 50 |
| Ex. 5 | $Li_6CoO_4$ | 5% | $LiNi_{0.8}Co_{0.1}Mn_{0.1}O_2$ | 91 | 5 | 2 | 2 | 50 |
| Ex. 6 | $Li_6CoO_4$ | 10% | $LiNi_{0.8}Co_{0.1}Mn_{0.1}O_2$ | 86 | 10 | 2 | 2 | 50 |
| Comp. Ex. 1 | — | — | $LiNi_{0.8}Co_{0.1}Mn_{0.1}O_2$ | 96 | — | 2 | 2 | 50 |

(2) Preparation of Lithium Metal Secondary Battery

Lithium metal secondary batteries according to Examples 1 to 6 and Comparative Example 1 were prepared using the prepared cathode and the anode composed of a single layer of a copper metal current collector (thickness: 10 μm). In addition, a battery of Comparative Example 2 was prepared by using the same cathode as Comparative Example 1, and an anode in which lithium metals were laminated on one surface of a copper metal current collector to have a thickness of 20 μm.

A separator made of porous polyethylene was interposed between the cathode and the anode, and placed in a pouch-shaped battery case. Then, an electrolyte in which 1 M $LiPF_6$ was dissolved in a solvent containing ethylene carbonate (EC) and ethyl methyl carbonate (EMC) at a volume ratio of 30:70 was injected into the battery case to prepare a lithium metal secondary battery.

Experimental Example: Performance Evaluation of Lithium Metal Secondary Battery

The prepared lithium metal secondary batteries were allowed to stand at room temperature for 2 days, were sufficiently impregnated with the electrolyte, and then charged to 4.25 V at 0.1 C for 10 hours, followed by aging at room temperature for 2 days. Thereafter, charging and discharging were performed once at 0.1 C in the range of 3 V to 4.25 V, and then the cell was disassembled to observe the anode.

FIG. 1 is an optical microscope (OM) image of the anode of Comparative Example 1, and FIG. 2 is an OM image of Example 3.

Referring to FIG. 1, in Comparative Example 1 in which the irreversible compensating additive was not added, it was confirmed that only the copper metal current collector was present without lithium metals remaining in the anode current collector after charging and discharging at 0.1 C.

In Example 3 in which the irreversible compensating additive ($Li_2NiO_2$) was added in an amount of 15 wt % (FIG. 2), lithium metals were coated on the copper metal current collector after charging and discharging at 0.1 C.

In addition, the cell of Example 3 was disassembled and the thickness of the anode was measured to be 17 μm. Considering the thickness of the copper metal current collector (10 μm), it can be confirmed that the lithium metals were applied at a thickness of 7 μm after charging and discharging once.

In the meantime, energy density of each lithium metal secondary battery was measured based on the initial discharge capacity and the thickness at SoC (State of Charge) 100 (energy density=nominal voltage*discharge capacity at 0.1 C/cell volume=cell length*width*thickness). Thereafter, the number of cycles at which SoH (State of Health) reached 80% by performing 0.1 C charging and 0.5 C discharging is shown in Table 2 below.

TABLE 2

| | Irreversible compensating additive | Wt % of irreversible compensating additive in cathode mixture | Energy density (Wh/L) | Number of cycles at which SoH reached 80% |
|---|---|---|---|---|
| Ex. 1 | $Li_2NiO_2$ | 5% | 1023 | 68 |
| Ex. 2 | $Li_2NiO_2$ | 10% | 1002 | 101 |
| Ex. 3 | $Li_2NiO_2$ | 15% | 967 | 131 |
| Ex. 4 | $Li_2NiO_2$ | 20% | 931 | 157 |
| Ex. 5 | $Li_6CoO_4$ | 5% | 953 | 53 |
| Ex. 6 | $Li_6CoO_4$ | 10% | 914 | 86 |
| Comp. Ex. 1 | — | — | 1087 | 17 |
| Comp. Ex. 2 (lithium metal anode was applied) | — | — | 870 | 110 |

Referring to Table 2, Comparative Example 1 in which the irreversible compensating additive and the lithium metal anode were not applied exhibited high energy density but extremely low battery life. On the other hand, Examples 1 to 6, in which the irreversible compensating additive was applied, exhibited remarkably improved battery life as compared with Comparative Example 1. Comparative Example 2 in which lithium metals were introduced into the anode from the battery assembling step had good battery life, but exhibited lower energy density than Examples 1 to 6 in which the irreversible compensating additive was applied.

On the other hand, in Examples 1 to 4 in which the content of the irreversible compensating additive was changed, the battery life was improved as the content of the additive increased, but the cathode capacity was decreased, so the energy density was also decreased. As a result, the content of the irreversible compensating additive was suitably adjusted according to the energy density and the target battery life of the cell to be prepared.

The invention claimed is:

1. A lithium secondary battery, comprising:
an anode composed of an anode current collector without anode active material;
a cathode containing a cathode mixture disposed on a cathode current collector;
a separator interposed between the anode and the cathode; and
an electrolyte,
wherein the cathode mixture comprises an irreversible compensating additive, and
the irreversible compensating additive comprises at least one selected from the group consisting of $Li_2NiO_2$, $Li_2CuO_2$, $Li_6CoO_4$, $Li_5FeO_4$, $Li_6MnO_4$, $Li_2MoO_3$, $Li_3N$, $Li_2O$, $LiOH$, and $Li_2CO_3$.

2. The lithium secondary battery of claim 1,
wherein a lithium metal layer is disposed on the anode current collector of the lithium secondary battery after a first 1 to 5 charges and discharges.

3. The lithium secondary battery of claim 2,
wherein the lithium metal layer has a thickness of 2 μm or more.

4. The lithium secondary battery of claim 1,
wherein the cathode mixture comprises an irreversible compensating additive, and
the irreversible compensating additive desorbs lithium ions upon initial charging of the lithium secondary battery to supply the lithium ions to the single layer of the anode current collector, and the irreversible compensating additive from which the lithium ions have been desorbed is converted into an irreversible state so that the lithium ions are not occluded.

5. The lithium secondary battery of claim 1,
wherein the irreversible compensating additive is contained in an amount of 1 to 50 wt % based on a total weight of the cathode mixture.

6. The lithium secondary battery of claim 1,
wherein the cathode mixture comprises at least one cathode active material selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0<y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3).

7. The lithium secondary battery of claim 1,
wherein a surface of the anode current collector has a lithium metal protective layer.

8. The lithium secondary battery of claim 7,
wherein the lithium metal layer is disposed between the anode current collector and the lithium metal protective layer of the lithium secondary battery after a first 1 to 5 charges and discharges.

9. The lithium secondary battery of claim 7,
wherein the lithium metal protective layer comprises an organic or inorganic compound having a lithium ion conductivity of $10^{-7}$ S/cm or more.

10. The lithium secondary battery of claim 9, wherein the organic compound having lithium ion conductivity comprises at least one ion-conducting polymer selected from the group consisting of polyethylene oxide (PEO), polypropylene oxide (PPO), polyethylene glycol (PEG), polyphosphazene, polysiloxane, polydimethylsiloxane, polyacrylonitrile (PAN), polymethylmethacrylate (PMMA), polyvinylchloride, polyvinylidene fluoride (PVDF), polyvinylidene fluoride-hexafluoropropylene (PVDF-co-HFP), polyethyleneimine, polyphenylene terephthalamide, polymethoxy polyethylene glycol methacrylate, and poly-2-methoxy ethyl glycidyl ether.

11. The lithium secondary battery of claim 1,
wherein the anode current collector further comprises an adhesive layer.

12. The lithium secondary battery of claim 1, wherein the irreversible compensating additive comprises $Li_2NiO_2$.

13. The lithium secondary battery of claim 1, wherein the irreversible compensating additive comprises $Li_6CoO_4$.

14. The lithium secondary battery of claim 1, wherein the cathode mixture further comprises a conductive material.

15. The lithium secondary battery of claim 14, wherein the conductive material is selected from the group consisting of graphite, carbon blacks, conductive fibers, metallic powders, conductive whiskers, conductive metal oxides and polyphenylene derivatives.

16. A method of preparing a lithium secondary battery comprising:
preparing an electrode assembly in which a cathode containing a cathode mixture disposed on a cathode current collector, a separator, and an anode composed of an anode current collector without anode active material are sequentially laminated, placing the electrode assembly in a battery case, injecting an electrolyte into an upper part of the case, and forming a lithium metal layer on the anode current collector by charging and discharging for the first several times, wherein the cathode mixture comprises an irreversible compensating additive, and the irreversible compensating additive comprises at least one selected from the group consisting of $Li_2NiO_2$, $Li_2CuO_2$, $Li_6CoO_4$, $Li_5FeO_4$, $Li_6MnO_4$, $Li_2MoO_3$, $Li_3N$, $Li_2O$, LiOH, and $Li_2CO_3$.

17. The method of claim 16, wherein
lithium ions are released from the irreversible compensating additive upon initial charging, are not occluded by the irreversible compensating additive during subsequent discharging, and are plated on the single layer of the anode current collector to form the lithium metal layer.

* * * * *